(12) United States Patent
Petersen et al.

(10) Patent No.: US 8,505,574 B2
(45) Date of Patent: Aug. 13, 2013

(54) LID FOR A MANIFOLD

(75) Inventors: Brian Terry Petersen, Davenport, IA (US); Paul Riewerts, Port Bryon, IL (US); Jay Olson, Bettendorf, IA (US)

(73) Assignee: Deere & Company, Moline, IL (US)

( * ) Notice: Subject to any disclaimer, the term of this patent is extended or adjusted under 35 U.S.C. 154(b) by 378 days.

(21) Appl. No.: 12/821,388

(22) Filed: Jun. 23, 2010

(65) Prior Publication Data
US 2011/0315246 A1    Dec. 29, 2011

(51) Int. Cl.
*A01C 7/16* (2006.01)
*A01C 7/20* (2006.01)
*B05B 1/26* (2006.01)
*B65G 53/40* (2006.01)

(52) U.S. Cl.
USPC ............... 137/561 A; 111/175; 239/553.5; 406/155; 406/181

(58) Field of Classification Search
USPC ............ 137/561 A, 883, 262; 406/155, 181; 239/553.5; 111/174, 175
See application file for complete search history.

(56) References Cited

U.S. PATENT DOCUMENTS

| | | | |
|---|---|---|---|
| 4,189,059 A * | 2/1980 | Shaw | 220/246 |
| 4,562,968 A | 1/1986 | Widmer et al. | |
| 5,282,573 A * | 2/1994 | Reimer | 239/85 |
| 6,227,770 B1 | 5/2001 | Poncelet et al. | |
| 6,273,648 B1 | 8/2001 | Poncelet et al. | |
| 6,290,433 B2 | 9/2001 | Poncelet et al. | |
| 7,726,508 B2 * | 6/2010 | Hasegawa | 220/372 |
| 2009/0235853 A1 * | 9/2009 | Schaffert | 111/163 |

FOREIGN PATENT DOCUMENTS

| | | |
|---|---|---|
| DE | 1287350 | 1/1969 |
| DE | 102007047689 | 4/2009 |
| EP | 0873676 | 10/1998 |
| EP | 0934689 | 8/1999 |
| EP | 0803177 B1 | 1/2003 |
| EP | 1342400 B1 | 5/2004 |
| EP | 0873675 B2 | 2/2006 |

OTHER PUBLICATIONS

European Search Report, received Oct. 17, 2011 (4 pages).

* cited by examiner

*Primary Examiner* — Craig Schneider
*Assistant Examiner* — Atif Chaudry

(57) ABSTRACT

A lid for a distribution manifold is described where the manifold has an inlet opening defining an axis, access opening opposite the inlet and a plurality of radially extending outlet ports. The lid for the access opening includes a mounting member adapted to couple the lid to the manifold to close the access opening, a cone coupled to the mounting member and extending axially toward the inlet opening of the manifold when the lid is coupled to the manifold, and a single piece retainer adapted to secure the cone to the mounting member without additional fasteners.

9 Claims, 6 Drawing Sheets

LID FOR A MANIFOLD

DETAILED DESCRIPTION

A manifold and distribution manifold assembly consisting of the manifold and a lid is provided and described below. The distribution manifold assembly is used to divide the flow of an air-entrained material from a primary distribution line into a plurality of secondary distribution lines. One application of such a distribution manifold assembly is in an agricultural air seeder.

In the figures.

Figure 1:
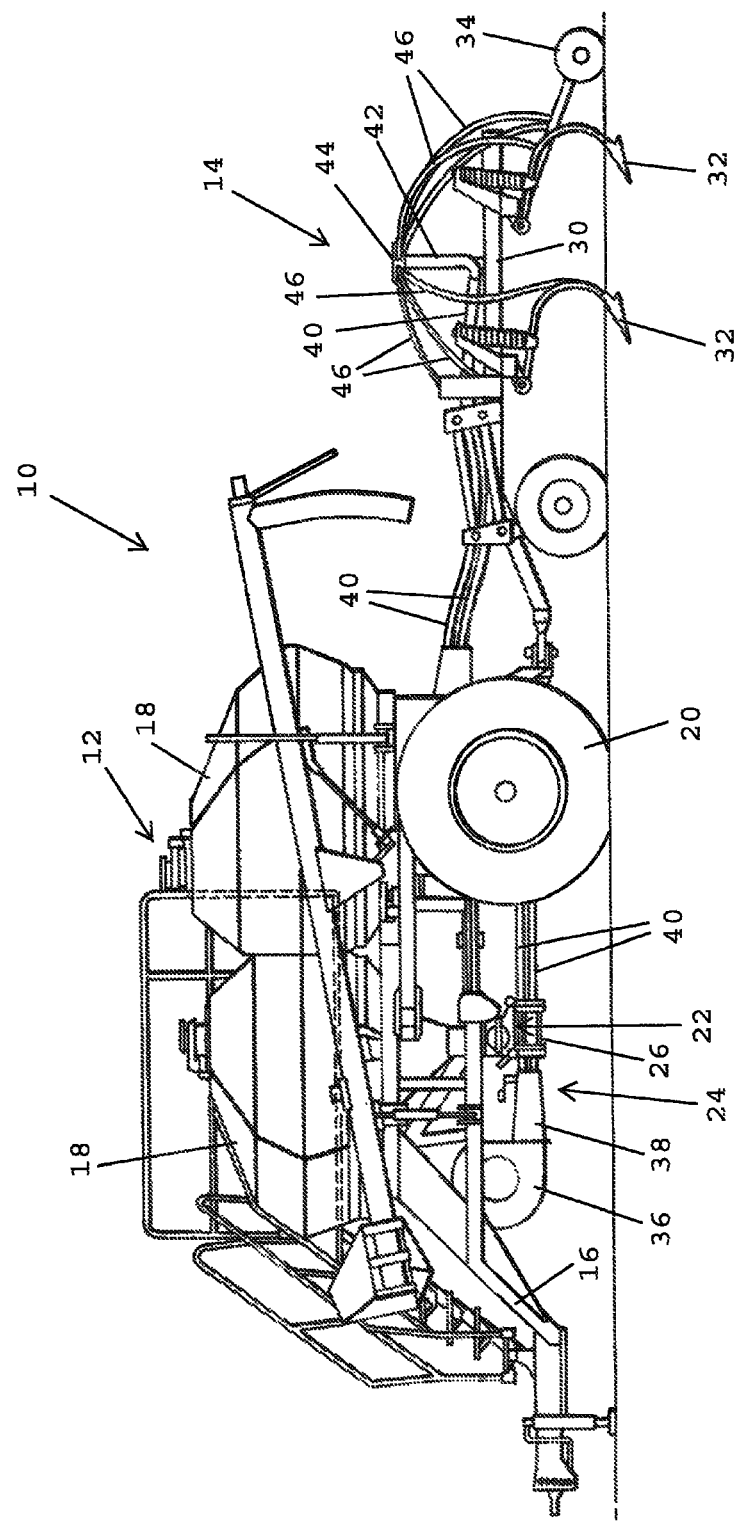
FIG. 1 is a side elevation view of an agricultural air seeder.
Figure 2:
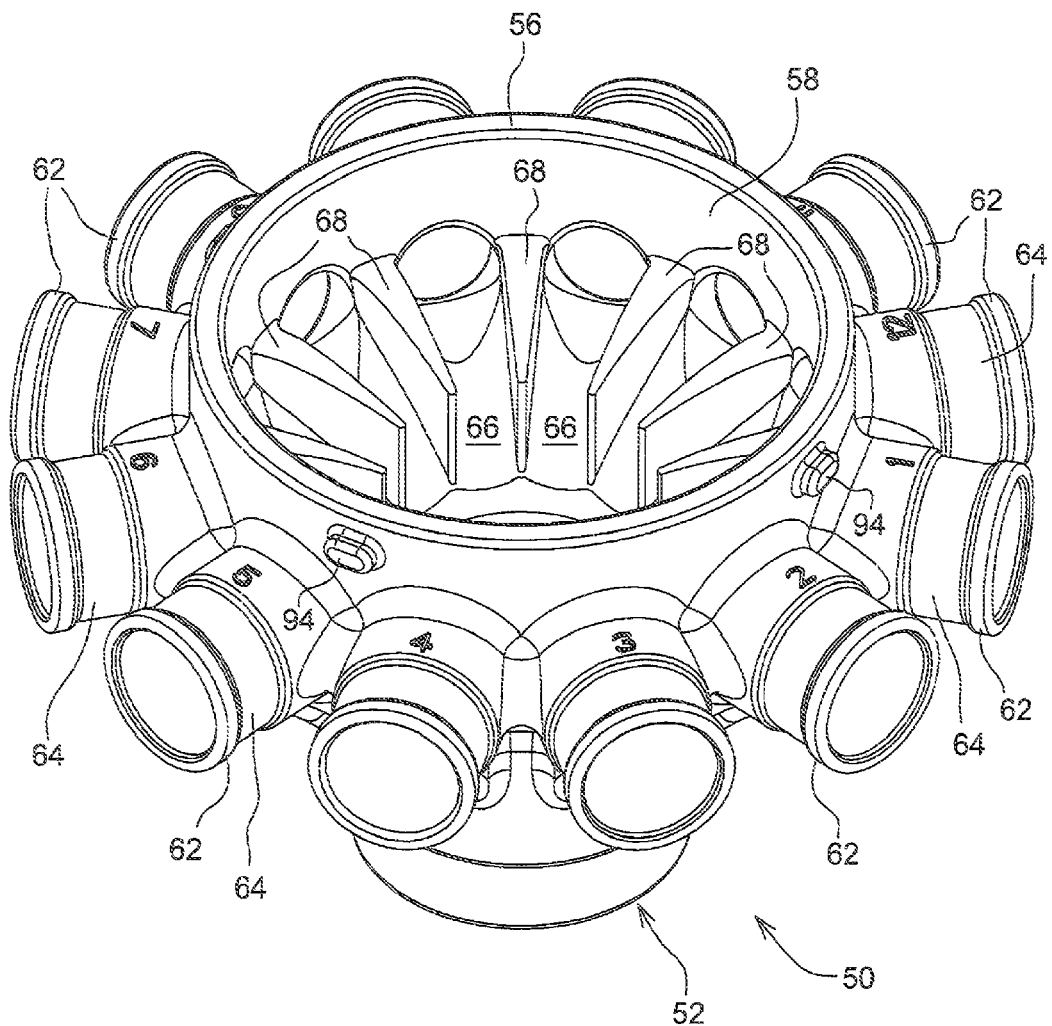
FIG. 2 is a top perspective view of the manifold described herein.
Figure 3:
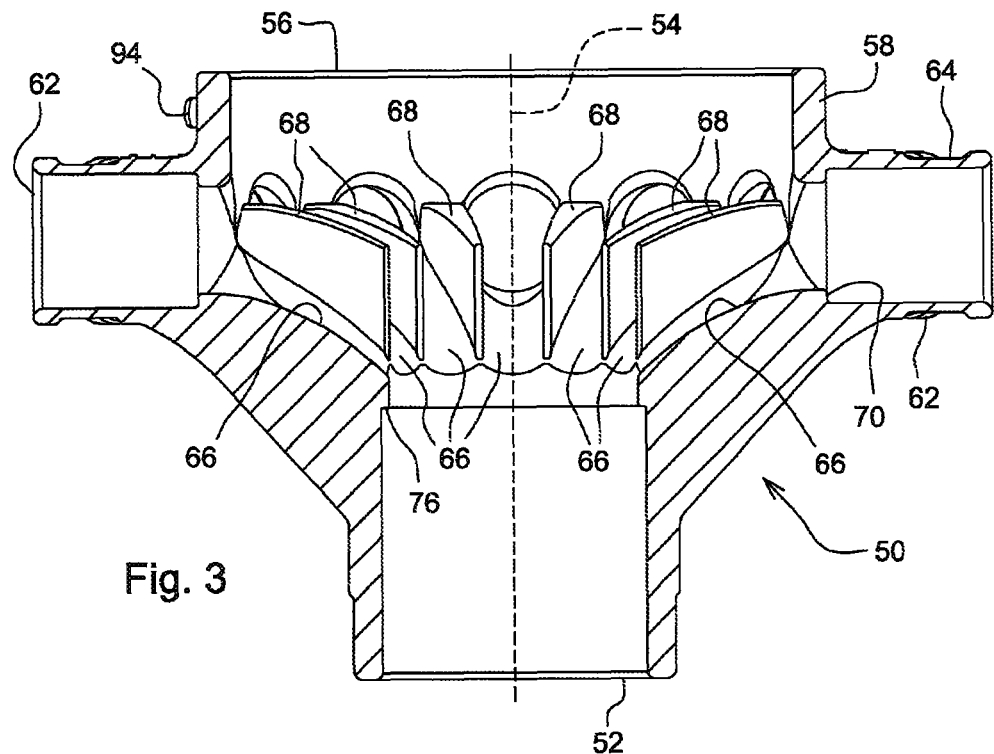
FIG. 3 is a vertical sectional view of the manifold of FIG. 2.
Figure 4:
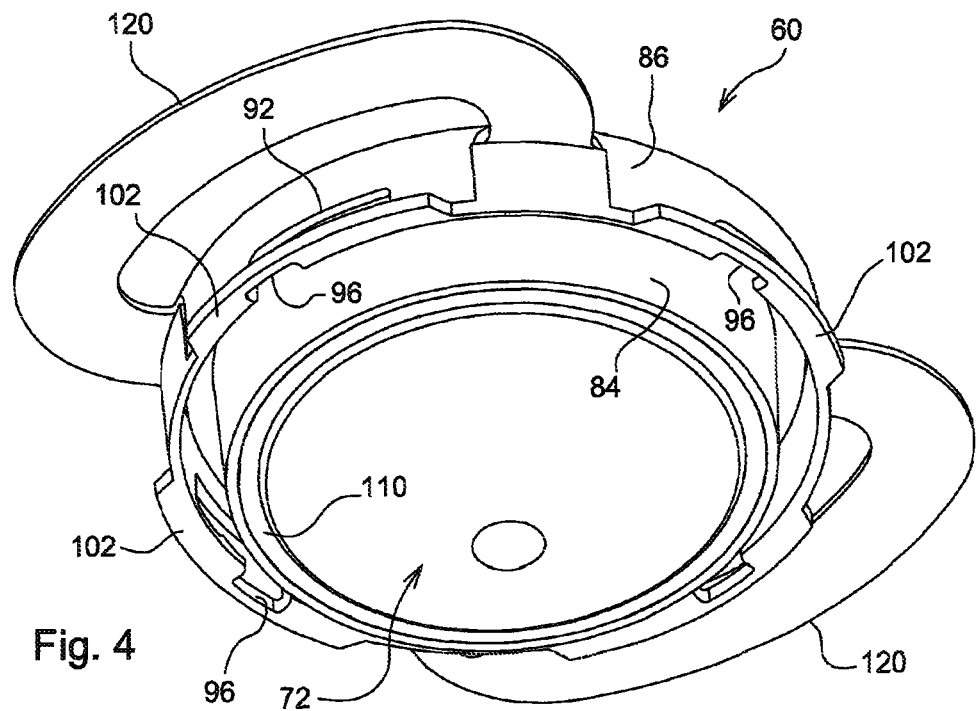
FIG. 4 is a bottom perspective view of a lid of the distribution manifold assembly described herein.

By way of example, with reference to FIG. 1, an air seeder 10 is shown comprising a seed cart 12 towed by a tractor (not shown) and a tillage implement 14. The seed cart 12 has a frame 16 to which product tanks 18 and wheels 20 are mounted. Each tank 18 has an associated metering system 22 at its lower end (only one of which is shown) for controlling and feeding of product into a pneumatic distribution system 24 and a primary manifold 26. The tillage implement 14, towed behind of the seed cart 12, consists generally of a frame 30 to which ground openers 32 are mounted. Incorporation of seed row finishing equipment such as closing wheels 34 is also desirable in many applications.

The pneumatic distribution system 24 includes a centrifugal fan 36 connected to a plenum 38 which is in turn connected to one or more primary manifolds 26, each associated with a product tank 18. The individual passages in the primary manifolds 24 are each connected to a primary distribution line 40 leading to a riser tube 42, only one of which is shown. Each riser tube 42 is in turn coupled to a distribution manifold assembly 44. Secondary distribution lines 46 connect the distribution manifold assembly 44 to seed boots mounted to the ground openers 32 to deliver product, seed, fertilizer, etc. to the furrow formed by the openers 32.

The manifold assembly 44 contains a manifold 50 and a lid 60. Manifold 50 is molded as a single piece and includes an inlet opening 52 which is cylindrical in shape, defining an axis 54. Inlet opening 52 is configured to couple to the end of the riser tube 42 to receive air-entrained material therefrom. The cylindrical shape of the inlet opening facilitates the even distribution of the material to the outlets ports described below, but other shapes can be used if desired. Opposite the inlet opening 52, the manifold 50 has an access opening 56 formed by an axially extending cylindrical wall 58. The access opening 56 is preferably larger than the inlet opening 52. Extending outwardly from the cylindrical wall 58 are a plurality of outlet ports 62. The outlet ports extending generally radially outwardly relative to the axis 54. The outlet ports are evenly spaced angularly about the manifold. The outlet ports 62 each receive a secondary distribution line 46 (FIG. 1) with the line of 46 inserted into the outlet ports 62. The exterior of each outlet port is formed with a recess or groove 64 in which a hose clamp (not shown) is seated to secure the secondary distribution line 46 in the outlet port 62. Typically, each outlet port 62 receives a secondary distribution line 46. However, if fewer secondary distribution lines are needed, some of the outlet ports 62 can be plugged. Troughs 66 extend radially outward from the inlet opening 52 to each outlet port 62. The troughs 66 are separated by raised ribs 68. A small step 70 is located at the transition of the trough 66 to the interior of the outlet port 62 to allow the inside of the secondary distribution lines 46 to form continuous surfaces from the troughs 66.

Figure 5:
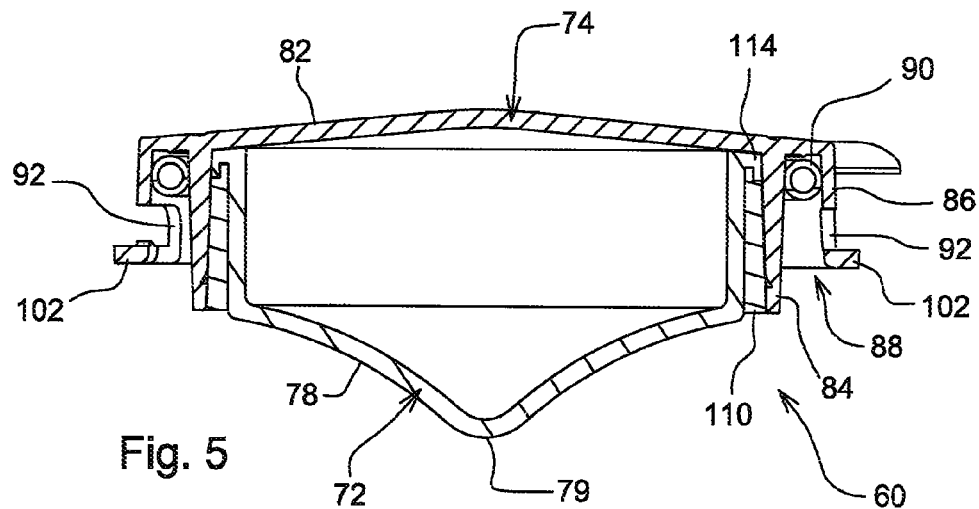
FIG. 5 is a vertical sectional view of the lid of FIG. 4.
Figure 6:
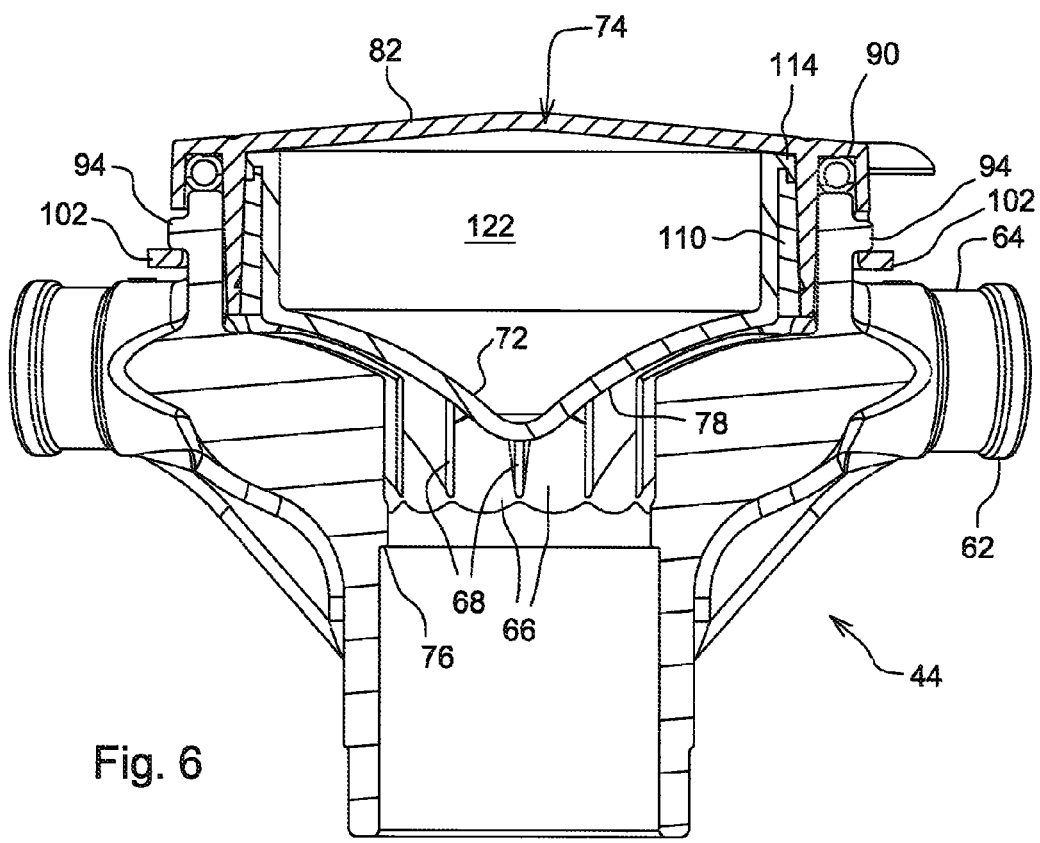
FIG. 6 is a vertical sectional view of the distribution manifold assembly described herein.
Figure 7:
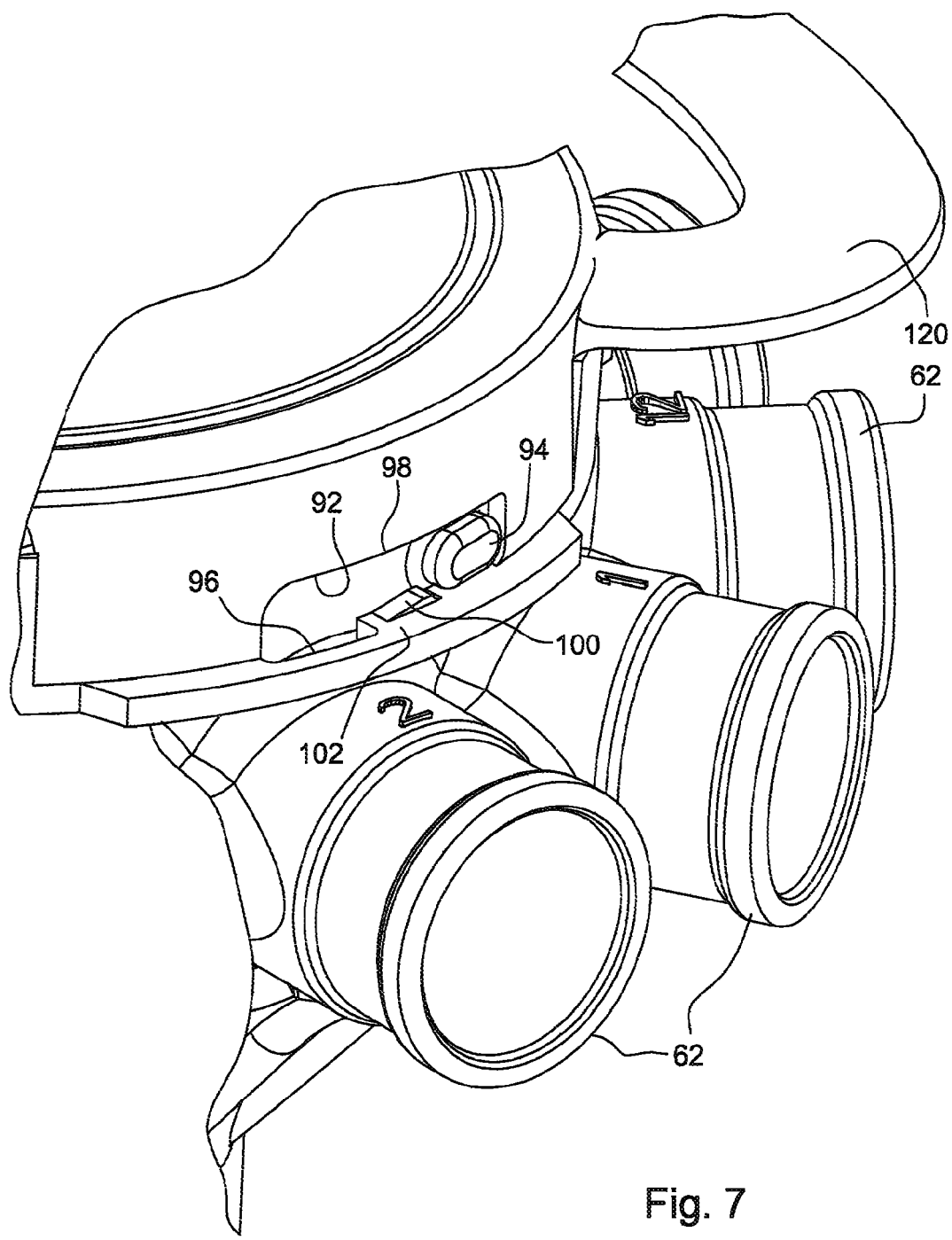
FIG. 7 is an enlarged view of the lid and manifold attaching structure.
Figure 8:
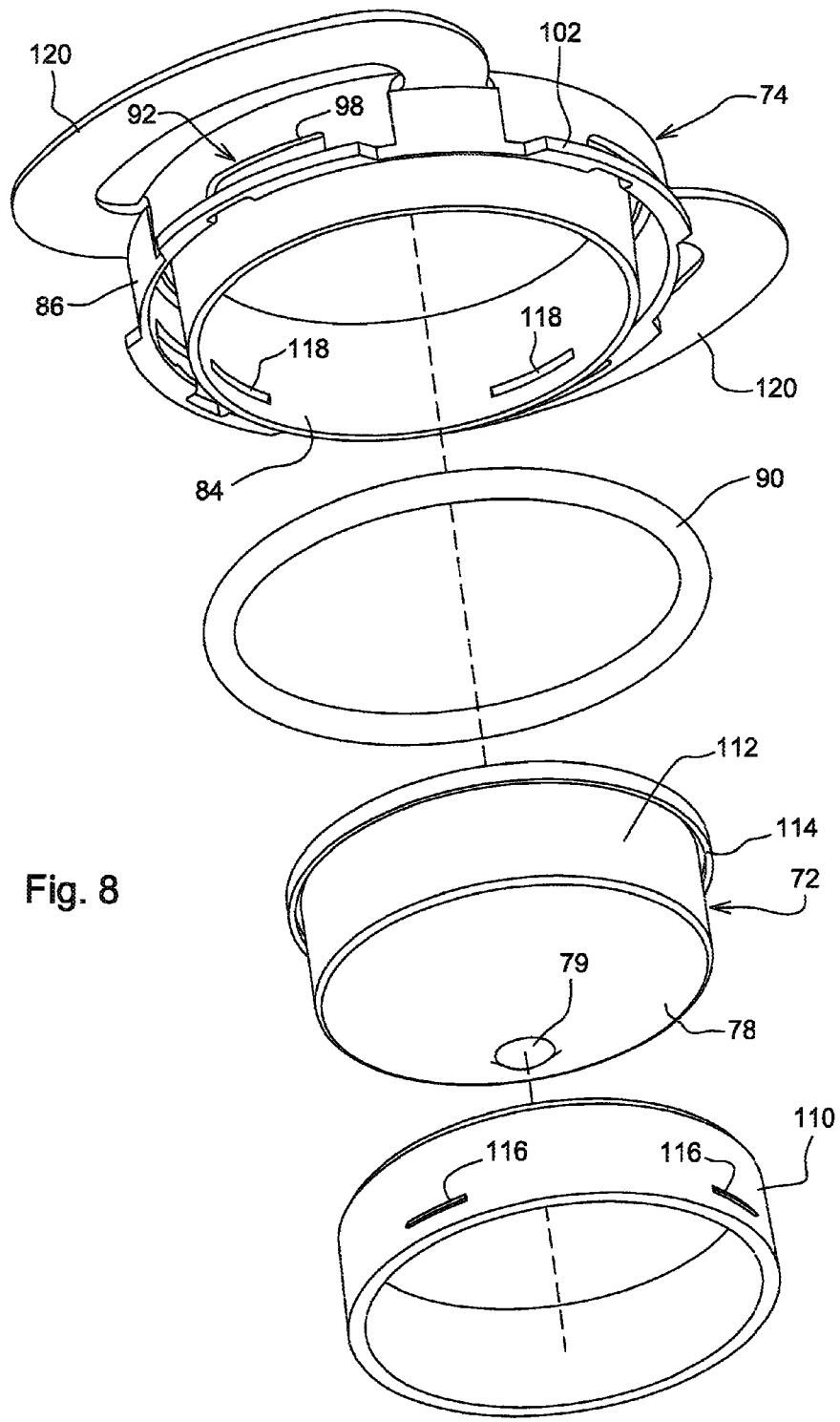
FIG. 8 is an exploded perspective view of the lid.

The lid 60 fits on to the manifold 50 to close the access opening 56. The lid includes an inner cone 72 and an outer mounting member 74. The cone 72 is snap fit into the mounting member while the mounting member attaches to the manifold 50. The cone has a lower wall 78 forming a downwardly projecting cone as shown in FIG. 5 forming a cone tip 79. The wall 78 is slightly concave to complement the top surface of the ribs 68. When the lid 60 is mounted on the manifold 50, the cone wall 78 is positioned slightly above the top of the raised ribs 68. Alternatively, the wall 78 can engage the top of the ribs.

As described above, the manifold 50 is positioned on the riser tube 42 with the riser tube 42 inserted into the opening 52 up to the step 76 at the top of the opening 52. With the lid 60 on the manifold, a hollow central area 80 is formed in the interior of the manifold above the riser tube 42 and below the wall 78 of the cone. The hollow central area 80 is generally in the center of the raised ribs 68.

The mounting member 74 has a top wall 82 and a pair of downwardly depending annular walls, inner annular wall 84 and outer annular wall 86. An annular groove 88 is formed between the walls 84, 86. An O-ring 90 is placed in the groove 88. The outer annular wall 86 has a plurality of slots 92 formed therein to receive projections 94 on the outer side of the manifold cylindrical wall 58. The slots 92 have a generally axially extending entry portion 96 to receive the project 94. The lid is then rotated about the axis to move the projection into a circumferentially extending portion 98 of the slot. When the lid is rotated, the projection moves over a retaining member 100 on one side of the slot which requires slight deformation of the wall 102 of the mounting member 74. Once seated on the manifold, the lid 60 requires a minimum twisting force be applied to the lid to move the projection back to the entry portion 94 of the slot 92 to remove the lid. When the lid is seated on the manifold, the cylindrical wall 58 bears against and deforms the O-ring 90 to create a seal between the manifold and the lid to prevent air leakage therebetween that would interfere with the transport of material in the air stream.

The cone 72 is attached to the mounting member 74 by a retainer in the form of a cylindrical retaining ring 110. Cone 72 has a cylindrical wall 112 having a radially outward extending lip 114 at its distal end 115, that is, the end of the cylindrical wall 112 distal to the cone tip 79. The cylindrical wall 112 is positioned inside the inner annular wall 84 of the mounting member. The retaining ring 110 fits between the cone cylindrical wall and the mounting member inner annular wall 84. The retaining ring 110 bears against the lip 114 to hold the cone in place. The retaining ring includes outward projecting tabs 116 that snap fit into grooves 118 in the inner annular wall 84 to hold the ring 110 in place and attach the cone to the mounting member 74. Other than the retaining ring 110, no additional fasteners are used to coupled the cone to the mounting member. The mounting member top wall 82 and the cone 72 define a hollow interior 122 of the lid. The hollow interior minimizes the quantity of material used to mold the components of the lid. The mounting member is also formed with two integral handles 120 for manipulating the lid 60.

In one embodiment, the manifold 50 is formed by a compression molding process. The material used for the manifold is a thermoset elastomer or a thermoplastic elastomer. One suitable material is EPDM with suitable UV stabilizers. The flexibility of the elastomer enables the outlet ports 62, in combination with the secondary distribution lines 46, to provide a slight press fit engagement to help secure the secondary lines 46 in the outlet ports. Furthermore the flexibility of the elastomer allows the outlet ports to be squeezed onto the secondary distribution line 46 by the hose clamps seated in the grooves 64. This provides a secure coupling of the secondary distribution lines in the respective outlet ports. The use of an elastomer, together with a compression molding process, provides for a low-cost manifold when the tooling cost and the piece cost are considered together for low volume production of the manifold. For higher volume production, an ejection molding process, using a thermoplastic urethane can be employed. The tooling cost is higher, but the individual part cost is lower and thus better suited for higher production volumes.

The cone 72 of the lid 60 is preferably formed of a thermoplastic polyurethane. This provides the high wear resistance necessary for the impact of the air entrained material. Such a material is relatively expensive. The mounting member 74, which need not have a high wear resistance, can be made of any rigid injection moldable material, preferably one that is inexpensive. The primary driver in the selection of the material for the mounting member is the structural strength for mounting the lid onto the manifold. A glass reinforced nylon is well-suited to this application.

A distribution manifold assembly has been described for use in dividing the flow of an air-entrained material from a primary distribution line into a plurality of secondary distribution lines. The manifold is formed of a single molded piece thereby reducing the overall tooling cost as compared to manifolds assembled of multiple molded components. One application of such a distribution manifold assembly is in an air seeder.

Having described one or more embodiments, it will become apparent that various modifications can be made without departing from the scope of the accompanying claims.

What is claimed is:

1. A lid for a distribution manifold, the manifold having an inlet opening defining an axis, access opening opposite the inlet and a plurality of radially extending outlet ports, the lid comprising:
    a mounting member adapted to couple the lid to the manifold to close the access opening, the mounting member having a top wall and a downwardly depending inner annular wall;
    a cone coupled to the mounting member and extending axially toward the inlet opening of the manifold when the lid is coupled to the manifold, the cone having a cone shaped wall forming a cone tip and a cylindrical wall disposed radially inward from the inner annular wall of the mounting member; and
    a single piece retainer adapted to secure the cone to the mounting member without additional fasteners, the retainer being a cylindrical ring positioned between the inner annular wall of the mounting member and the cylindrical wall of the cone and adapted to secure the cone to the mounting member.

2. The lid as defined by claim 1 wherein the cone and mounting member define a hollow interior.

3. The lid as defined by claim 1 wherein the cone cylindrical wall has a lip at a distal end thereof trapped by the retaining ring to hold the cone in place relative to the mounting member.

4. The lid as defined by claim 1 wherein the retaining ring and the inner annular wall have complementary snap engagement elements.

5. The lid as defined in claim 1 wherein the material for the mounting member is selected for its structural properties to mount on the manifold and the material for the cone is selected for wear resistance.

6. The lid as defined in claim 1 wherein the material for the mounting member is rigid injection moldable material.

7. The lid as defined in claim 6 wherein the material for the mounting member is a glass reinforced nylon.

8. The lid as defined in claim 1 wherein the material for the lid is selected from the group of thermoset elastomer and thermoplastic elastomer.

9. The lid as defined in claim 1 wherein the material for the lid is EPDM with UV stabilizers.

* * * * *